(12) United States Patent
Lee

(10) Patent No.: US 9,068,727 B2
(45) Date of Patent: Jun. 30, 2015

(54) ZOOMABLE LED FLASHLIGHT

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 81 days.

(21) Appl. No.: 13/969,615

(22) Filed: Aug. 19, 2013

(65) Prior Publication Data

US 2013/0335955 A1 Dec. 19, 2013

Related U.S. Application Data

(63) Continuation-in-part of application No. 13/345,759, filed on Jan. 9, 2012, now abandoned.

(51) Int. Cl.
| | |
|---|---|
| *F21L 4/00* | (2006.01) |
| *F21V 14/06* | (2006.01) |
| *F21V 5/00* | (2015.01) |
| *F21V 5/04* | (2006.01) |
| *G02B 19/00* | (2006.01) |
| *F21L 4/02* | (2006.01) |
| *F21Y 101/02* | (2006.01) |

(52) U.S. Cl.
CPC .............. *F21V 14/065* (2013.01); *F21V 5/008* (2013.01); *F21V 5/048* (2013.01); *F21Y 2101/02* (2013.01); *G02B 19/0047* (2013.01); *G02B 19/0014* (2013.01); *F21L 4/027* (2013.01)

(58) Field of Classification Search
CPC ....... F21V 14/06; F21V 14/065; F21V 4/027; F21V 5/008; F21V 5/048; G02B 19/0047; G02B 19/0014
USPC ......... 362/186, 187, 197, 202, 205, 208, 277, 362/280, 311.04, 311.06, 311.1, 311.15, 362/319
See application file for complete search history.

(56) References Cited

U.S. PATENT DOCUMENTS

| | | | |
|---|---|---|---|
| 5,595,435 A * | 1/1997 | Palmer et al. ................. | 362/187 |
| 7,461,945 B2 | 12/2008 | Shiau | |
| 8,070,339 B2 * | 12/2011 | Koike ........................ | 362/311.1 |

* cited by examiner

*Primary Examiner* — Y M Lee

(57) ABSTRACT

A flashlight includes a housing, a LED light source and an asymmetrical biconvex lens. The light source is coupled to the housing for generating a light for illumination. The biconvex lens is formed by injection-molding a resin material, for condensing the light generated by the LED light source into a concentrated light beam having a pattern of consistent brightness. The biconvex lens is located a given distance away from the LED light source. The biconvex lens includes opposing first and second spherical surfaces. The first spherical surface is closest to the LED light source with a first radius of curvature; and the second spherical surface being farthest from the LED light source with a second radius of curvature. And the first radius of curvature is substantially at least five times more than the second radius of curvature.

3 Claims, 5 Drawing Sheets

ZOOMABLE LED FLASHLIGHT

CROSS-REFERENCE TO RELATED APPLICATION

This is a continuation-in-part of co-pending application Ser. No. 13/345,759, filed on Jan. 9, 2012.

BACKGROUND OF THE INVENTION

1. Field of the Invention

The present invention relates generally to a flashlight and more particularly to an LED flashlight which allows continuously variable beam diameters from spot to wide angle.

2. Description of the Related Art

A typical prior art flashlight employs a conical-shaped reflector oriented behind an incandescent light bulb to provide a forward focused pattern of light around a target object. The uneven brightness and on and off-axis bright spots are caused by imperfections in the surface of the reflector. The light pattern provided by such an arrangement is usually uneven in brightness with on and off-axis bright spots. Inconsistent light patterns are lower in overall light intensity which hampers the identification of the target object to be viewed.

Today flashlights use mostly light-emitting diodes as light sources. For example, U.S. Pat. No. 7,461,945 discloses a focus-adjustable LED flashlight comprising a tubular housing; an LED light-emitting unit coupled to the tubular housing; a sleeve unit coupled movably to the tubular housing; and a positive lens mounted in the sleeve unit and spaced apart from and aligned with the LED light-emitting unit along an axis of the tubular housing. The sleeve unit is movable relative to the tubular housing and the LED light-emitting unit along the axis of the tubular housing so as to adjust a distance between the positive lens and the LED light-emitting unit. Specifically, the positive lens is preferably a plano-convex lens, as mentioned in that patent. It is because the plano-convex lens shows minimum spherical aberration when oriented with its plane surface facing the light source, when compared with a usual symmetric convex singlet or a reversed plano-convex lens. Furthermore, since a plano-convex lens costs much less to manufacture than a biconvex lens, the plano-convex lens is quite popular.

However, in practice, it is difficult to make a thick plano-convex lens, with a desired short focal distance, by injection-molding from a polymer material because the convex side of the plano-convex lens would be highly curved and thus the lens become relatively thick across its middle and thin at its upper and lower edges. That is to say, when molding such thick lens, problematic short shots occur because the polymer melt cannot fill the entire cavity. Thus, nowadays flashlights use mostly plano-convex lenses formed from a glass material.

SUMMARY OF THE INVENTION

Accordingly, it is an object of the present invention to provide a flashlight, which can provide a much brighter and evenly focused light beam pattern by utilizing a lens which causes less spherical aberration.

It is another object of the present invention to provide a flashlight that employ a plastic molded lens with a relatively short focus distance and the maximum possible molded thickness.

It is yet another object of the present invention to provide a flashlight which allows continuously variable beam diameters from spot to wide angle.

To achieve the foregoing objectives, the flashlight includes a housing, a LED light source, an asymmetrical biconvex lens and a sliding zoom assembly. The housing has a first end and a second end. The LED light source is coupled to the first end of the housing for generating a light to illuminate remotely located objects. The asymmetrical biconvex lens is formed by injection-molding a PMMA material, for condensing the light generated by the LED light source into a concentrated light beam having a pattern of consistent brightness, wherein the asymmetrical biconvex lens is located a given distance away from the LED light source in a location which is remote from the first end of the housing. The sliding zoom assembly is coupled to the first end of the housing, for housing the asymmetrical biconvex lens. The sliding zoom assembly operates to vary the given distance between the asymmetrical biconvex lens and the LED light source to provide a variable diameter light beam.

More specifically, the asymmetrical biconvex lens includes opposing first and second spherical surfaces, the first spherical surface being closest to the LED light source with a first radius of curvature; and the second spherical surface being farthest from the LED light source with a second radius of curvature. And, the first radius of curvature is finite and substantially at least five times more than the second radius of curvature for providing a substantially short focal distance and substantially minimizing spherical aberrations in the light beam.

Further benefits and advantages of the present invention will become apparent after a careful reading of the detailed description with appropriate reference to the accompanying drawings.

DETAILED DESCRIPTION OF EMBODIMENTS

Figure 1:
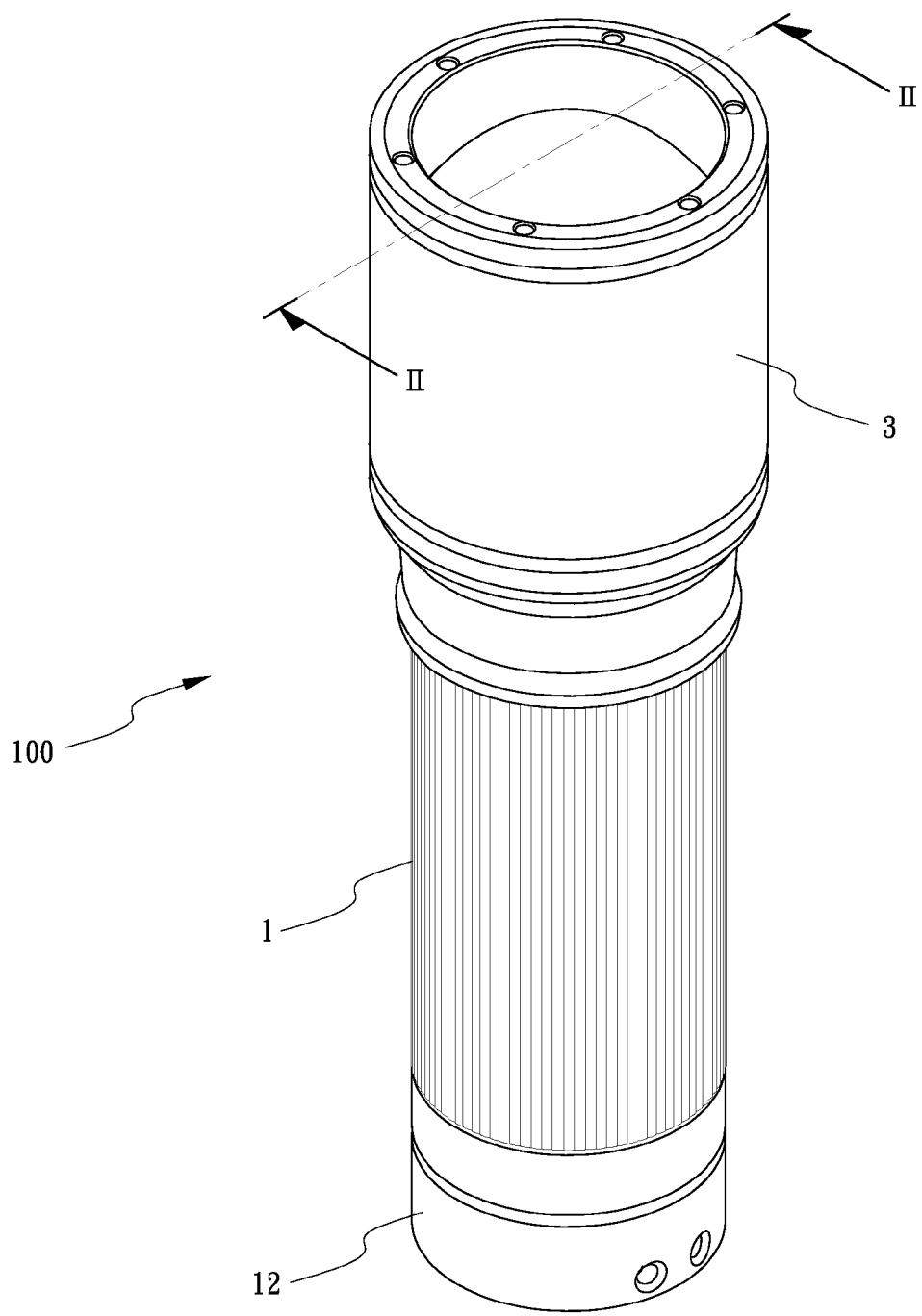
FIG. 1 is a perspective view of an embodiment of a flashlight according to the present invention.
Figure 2:
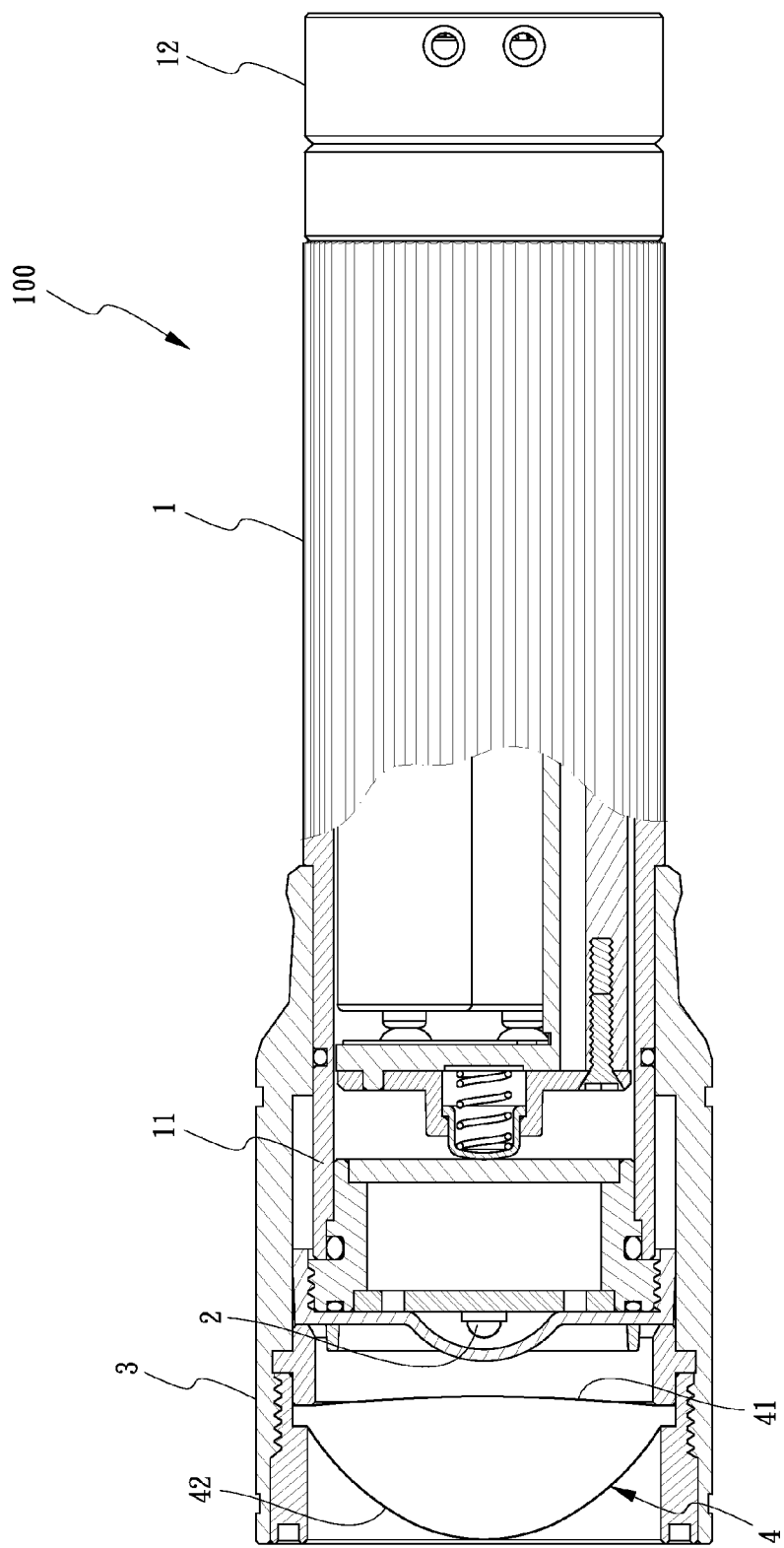
FIG. 2 is a side view, partially broken away, of the flashlight, taken along the line II-II of FIG. 1.
Figure 3:
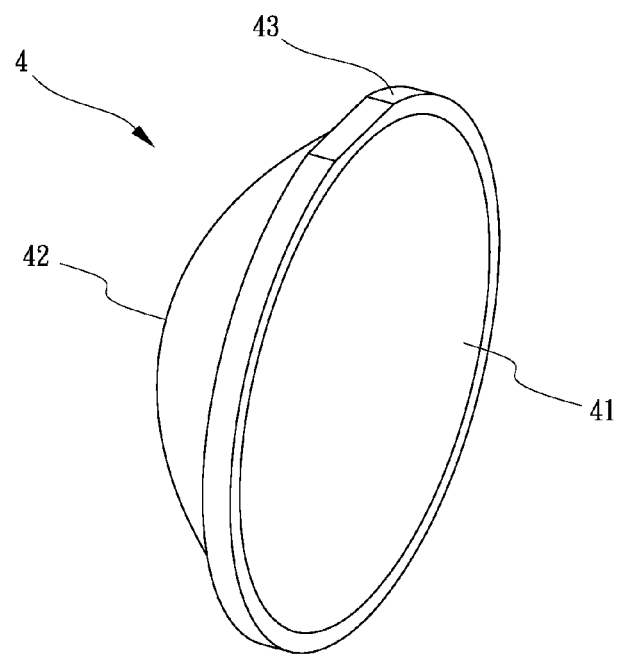
FIG. 3 is a perspective view of a lens employed in the flashlight of FIG. 2.
Figure 4:
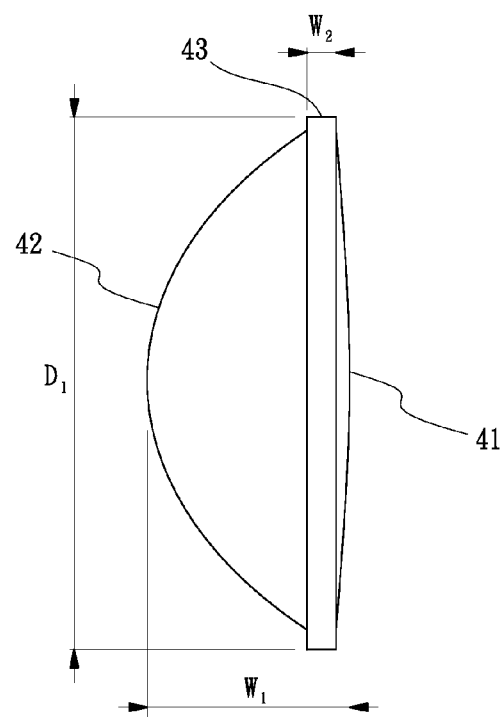
FIG. 4 is a side view of the lens as shown in FIG. 3.

In FIG. 1 of the drawings, there is shown a flashlight 100 including a housing 1 and a sliding zoom assembly 3 coupled to the housing 1. Referring to FIG. 2, the housing 1 of the flashlight 100 has a first end 11 and a second end 12. Coupled to the first end 11 of the housing 1 is a LED light source 2 that operates to generate a light to illuminate remotely located objects (not shown). The sliding zoom assembly 3 is also coupled to the first end 11 of the housing 1 and operates to provide continuously variable beam diameters from spot size to wide angle. More importantly, the flashlight 100 employs a relatively inexpensive plastic molded lens 4, as best seen in FIG. 3 or 4, which eliminates a glass plano-convex lens used in a conventional LED flashlight.

Specifically, the plastic molded lens 4 is an asymmetrical biconvex lens housed in the sliding zoom assembly 3. The lens 4 is formed by injection-molding a PMMA material (Poly(methyl methacrylate)) and is located a given distance away from the LED light source 2 in a location which is remote from the first end 11 of the housing 1. Moreover, the lens 4 is configured to condense the light generated by the LED light source 2 into a concentrated light beam having a pattern of consistent brightness. The sliding zoom assembly 3 operates to vary the given distance between the lens 4 and the LED light source 2 to provide a variable diameter light beam, as shown in FIGS. 5 and 6, as will be discussed in detail later.

Referring to FIG. 2, the lens 4 includes opposing first and second spherical surfaces 41, 42 and a circumferential seating surface 43 extending between the first and second spherical surfaces 41, 42. The first spherical surface 41 is closest to the LED light source 2 with a first radius of curvature. The second spherical surface 42 is farthest from the LED light source 2 with a second radius of curvature. It is noted that although the first spherical surface 41 is relatively flat, the first radius of curvature of the first spherical surface 41 is finite, rather than infinite, and substantially at least five times more than the second radius of curvature. In this embodiment, the first radius of curvature of the first spherical surface 41 is approximately 107.5 mm and the second radius of curvature is approximately 12.5 mm. This makes the first radius of curvature of the first spherical surface 41 approximately 8.6 times as much as the second radius of curvature of the second spherical surface 42. In this manner, the lens 4 provides a substantially short focal distance because the first spherical surface 41 is slightly curved, rather than completely flat, and substantially minimizes spherical aberrations in the light beam because the first spherical surface 41 is close to flat.

In this preferred embodiment, the asymmetrical biconvex lens 4 has an overall width W1 of approximately 11 mm and an aperture with a diameter D1 of approximately 27.2 mm to meet the criteria. It is noted that, the circumferential seating surface 43 is substantially formed at the place where the PMMA material is injected in the cavity of the mold, therefore, the circumferential seating surface 43 of the lens 4 has a width W2 of at least 1.5 mm as required by the injection molding.

Figure 5:
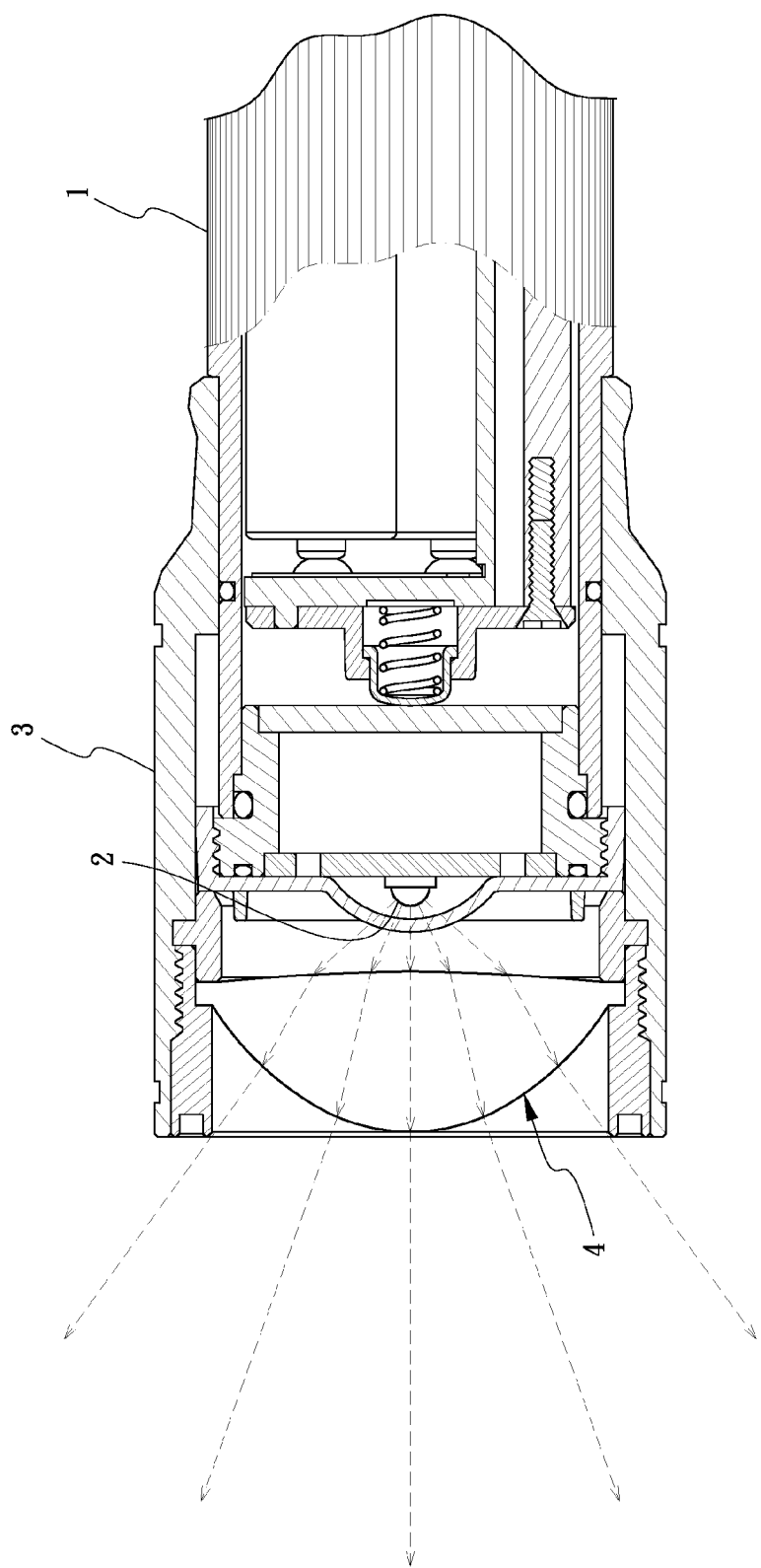
FIG. 5 is a view similar to FIG. 2, illustrating that the lens collimates rays of light emitted from a LED light source of the flashlight.
Figure 6:
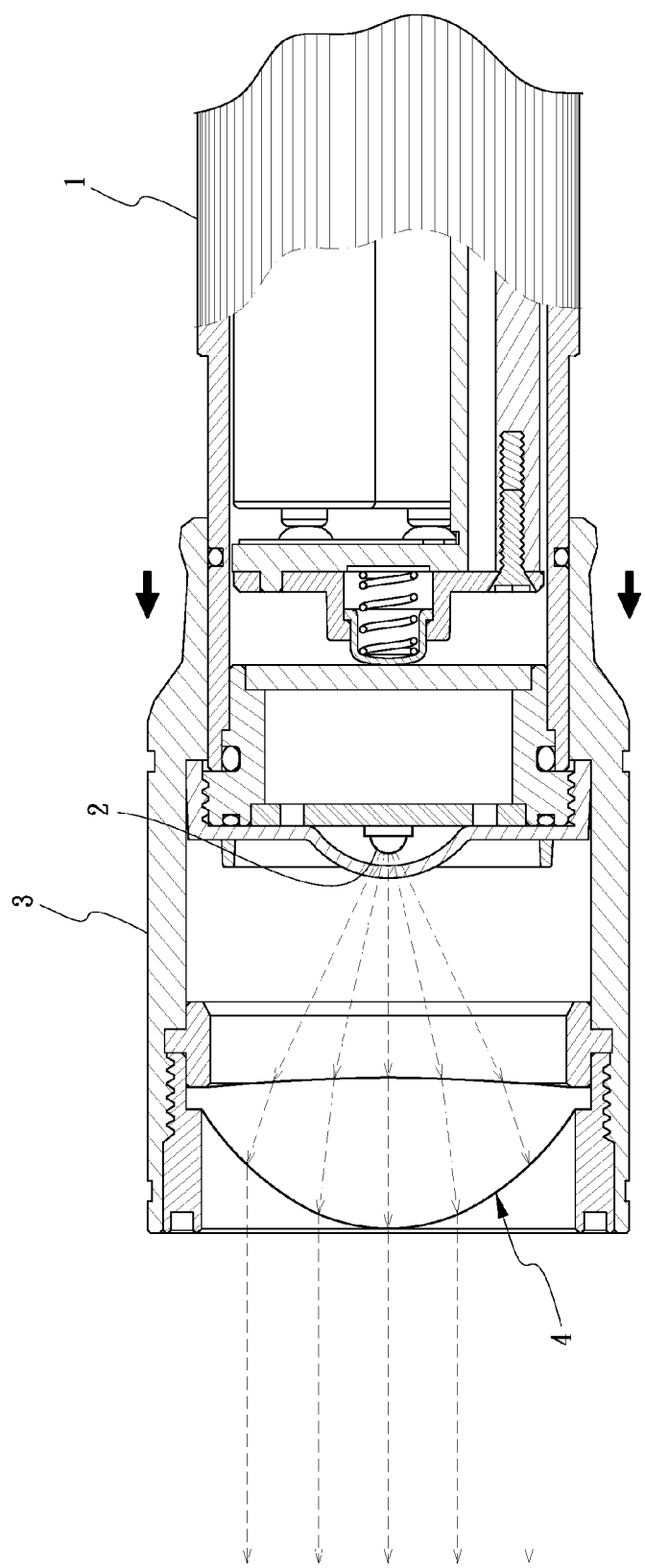
FIG. 6 is a view similar to FIG. 5, illustrating that the lens is moved away from the LED light source to collimate the rays of light.

FIG. 5 illustrates the flashlight 100 in a state of use where the lens 4 diverges rays of light emitted from the LED light source 2. The lens 4 may then be displaced forward, as shown in FIG. 6, by moving the sliding zoom assembly 3 with respect to the housing 1 such that the lens 4 can collimate the rays of light emitted from the further spaced LED light source 2.

It is to be understood that the disclosed embodiments are illustrative in nature and the invention is not to be limited to any one or more embodiments except as set forth in the following claims.

What is claimed is:

1. A flashlight comprising:
a housing having a first end and a second end;
a LED light source coupled to the first end of the housing for generating a light to illuminate remotely located objects;
an asymmetrical biconvex lens formed by injection-molding a resin material, for condensing the light generated by the LED light source into a concentrated light beam having a pattern of consistent brightness, wherein the asymmetrical biconvex lens is located a given distance away from the LED light source in a location which is remote from the first end of the housing, the resin material includes PMMA (Poly(methyl methacrylate)); and
a sliding zoom assembly coupled to the first end of the housing, for housing the asymmetrical biconvex lens, the sliding zoom assembly operating to vary the given distance between the asymmetrical biconvex lens and the LED light source to provide a variable diameter light beam;
wherein the asymmetrical biconvex lens includes opposing first and second spherical surfaces, the first spherical surface being closest to the LED light source with a first radius of curvature; and the second spherical surface being farthest from the LED light source with a second radius of curvature; and wherein the first radius of curvature being finite and substantially at least five times more than the second radius of curvature for providing a substantially short focal distance and substantially minimizing spherical aberrations in the light beam; and
wherein the asymmetrical biconvex lens further has a circumferential seating surface extending between the first and second spherical surfaces; the circumferential seating surface having a width of at least 1.5 mm as required by the injection molding due to the circumferential seating surface is substantially formed at the place where the resin material including PMMA is injected in a cavity of a mold.

2. The flashlight of claim 1, wherein the asymmetrical biconvex lens has an overall width of approximately 11 mm and an aperture with a diameter of approximately 27.2 mm, and the asymmetrical biconvex lens further has a circumferential seating surface extending between the first and second spherical surfaces.

3. The flashlight of claim 2, wherein the first radius of curvature of the asymmetrical biconvex lens is approximately 107.5 mm and the second radius of curvature is approximately 12.5 mm.

* * * * *